J. G. NOLEN.
SUPERVISORY SYSTEM.
APPLICATION FILED JULY 23, 1909.
1,219,143.
Patented Mar. 13, 1917.
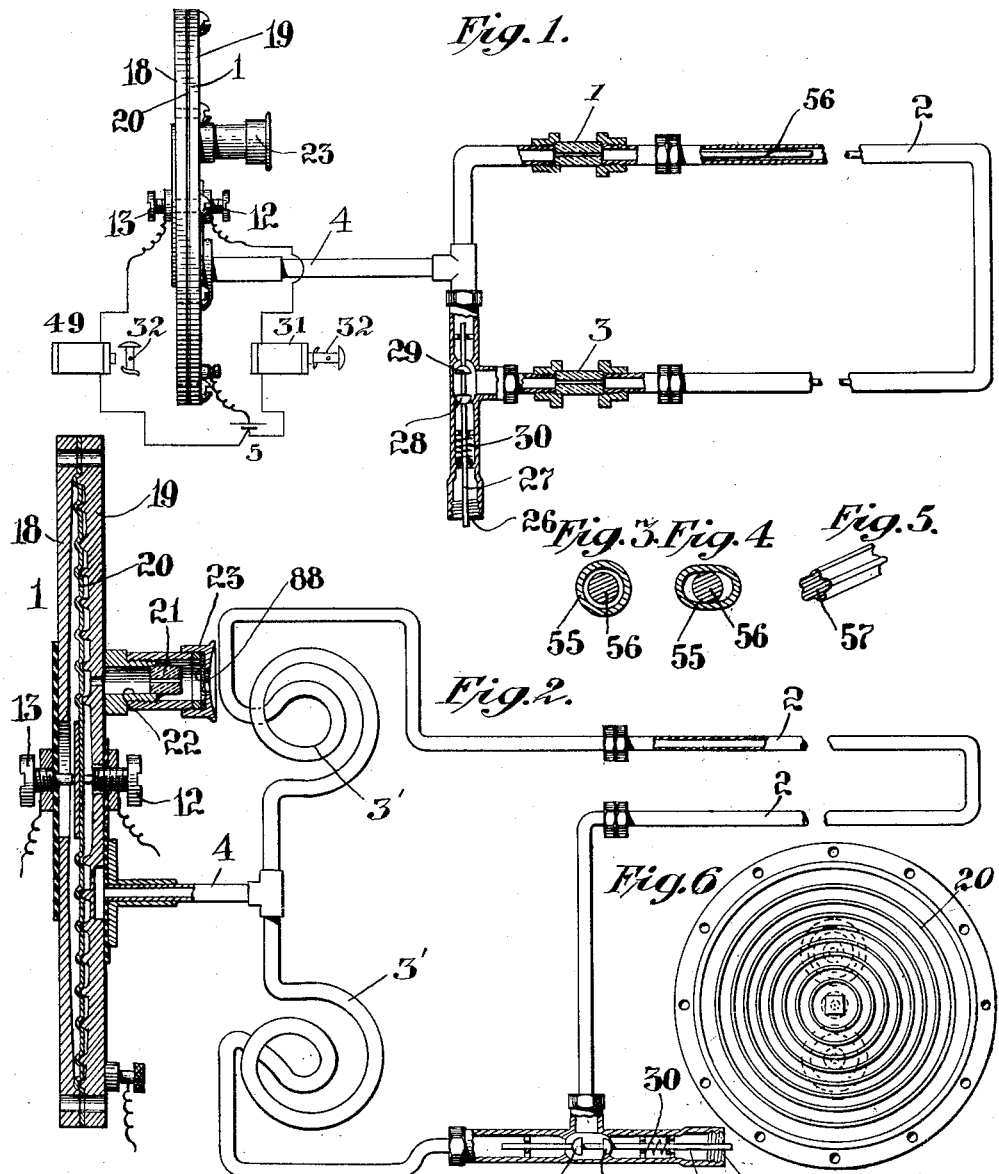
Attest:
by
Inventor:
James G. Nolen
Atty

UNITED STATES PATENT OFFICE.

JAMES G. NOLEN, OF NEW YORK, N. Y., ASSIGNOR, BY MESNE ASSIGNMENTS, TO AUTOMATIC FIRE PROTECTION COMPANY, OF NEW YORK, N. Y., A CORPORATION OF MAINE.

SUPERVISORY SYSTEM.

1,219,143. Specification of Letters Patent. Patented Mar. 13, 1917.

Application filed July 23, 1909. Serial No. 509,103.

*To all whom it may concern:*

Be it known that I, JAMES G. NOLEN, a citizen of the United States, residing at New York, in the county of New York and State of New York, have invented a certain new and useful Supervisory System, of which the following is a specification.

My invention relates to supervisory alarm systems such as are employed for indicating sudden and excessive rise in temperature, and particularly to electro-pneumatic systems of the class referred to. Such systems comprise piping of small bore laid through the space to be protected or supervised, and connected to one or more pressure-actuated alarm-initiating devices, which latter devices are arranged to be actuated by expansion of air in the piping caused by sudden rise of temperature, and may themselves indicate the alarm, or may be electric contact devices adapted when actuated to transmit an alarm through an electric circuit, or to set in operation other transmitting means; or these fluid-pressure-actuated alarm-initiating devices may operate to effect indication of abnormal conditions, or to effect the transmission of a signal, in various other ways.

In such systems, since the alarm-initiating device should not be operated by slow rise of temperature, such as may be occasioned by natural causes and may extend through a wide range, it is customary to provide an escape vent, through which air will escape slowly, but with sufficient rapidity to prevent the signal-initiating device being actuated by slow rise of temperature, but which will not permit escape of air at such rate as to prevent actuation of the signal-initiating device when the temperature rises rapidly. The provision of a suitable vent, which will permit sufficient escape of air to prevent alarms under normal conditions but will insure alarms under abnormally rapid rise of temperature, has proved to be a difficult matter, however; needle valves and the like, when employed, being apt to be affected by dust, or moisture, or by corrosion of the metal parts, and other disturbing conditions of actual use. And similar objections exist with respect to other escape-regulating means heretofore employed.

I have discovered that the use of a small glass tube of extremely small diameter of bore, as the escape-regulating means, obviates the difficulties heretofore experienced in the use of other devices for the same purpose. I prefer, for most purposes, a glass tube about three-eights of an inch in length and of about five-thousandths of an inch diameter of bore. Such an escape-regulating device is not affected by exposure to air or other gases, since it is not oxidizable and is practically inert, chemically; it is not affected by prolonged exposure to temperatures approaching those at which combustion usually occurs; it is not affected by moisture, and since the diameter of its bore is less than that of average dust grains, it is not affected by dust. Furthermore, such an escape-regulating device will serve lengths of pipe varying greatly in length. It is ordinarily required that no alarm shall be sent when the temperature rises no more rapidly than four degrees per minute, but that an alarm shall be given if the temperature rises twenty degrees in five minutes. I have found that a glass tube of the length and diameter of bore above stated will serve tubing varying in length from fifty to nine hundred feet, and having a diameter of bore of about .053 in., and between these lengths will prevent the giving of an alarm when the temperature rises only four degrees F. per minute, but will cause the transmission of the alarm if the temperature rises 20 degrees F. in five minutes.

It is probable that in a tube of so small diameter, as the glass tube above mentioned, the character of the inner surface of the tube has much to do with its action as a flow-retarding agent—quite as much, in fact, as slight change in diameter or in length. Glass, I have found, has a particularly favorable surface for this purpose, being far superior to metal.

In order to decrease the chances of an alarm being prevented through breakage or closing together of the metal tubing, it has been proposed to employ the piping or tubing in the form of a loop, both ends of the loop being connected to the pressure-actuated signal-initiating device, which latter is usually a diaphragm contact device. But this has the objection that if the pipe be broken, at one side of the loop, at a point near the pressure-actuated signal-initiating device, the leakage at the point of break, plus the escape from the escape-regulating device of the apparatus, may prevent any alarm being sent. To obviate this objection, I provide impedance devices in both sides of the loop, near the pressure-actuated signal-initiating device, and preferably I do not connect both sides of the loop to the said signal-initiating device, but instead I connect the ends of the pipe, between the impedance devices, so as to form a continuous loop circuit, independent of the signal-initiating device, and connect this loop, at a point between the impedance devices, to the signal-initiating device. The two impedance devices being very close to the signal-initiating device (and preferably in the same case therewith), there is practically no opportunity for a breakage between the signal-initiating device and either impedance device, or for the pipe to be closed together in the same region; and if the pipe be broken, on one side of the loop, at any point outside of the impedance devices, that impedance device nearest the break will offer so much resistance to escape of air from the pressure-operated signal-initiating device and from the connection between the impedance devices, that a sudden rise in temperature in the vicinity of the other side of the loop will cause an alarm to be sent.

My invention comprises, therefore, an improved escape-regulating device; and an improved arrangement of the piping, such that a break in the piping will not interfere materially with the operation of the apparatus. Other features of my invention are, an improved diaphragm contact device, particularly adapted to be operated by small sudden pulses of air such as are transmitted through the fine tubing employed; an improved detector tube; means for testing the system; and various other features hereinafter described and particularly pointed out in the claims.

The objects of my invention are to improve supervisory alarm systems of the type referred to, and make them more reliable, satisfactory, and elastic; to prevent material disturbance with the operation of the system by the occurrence of a break or stoppage in the piping; to improve the diaphragm contact devices employed in these systems; to improve the annunciators employed; to provide for testing; and generally to make the system simple, reliable, automatic, free from fine adjustments, and satisfactory.

I will now proceed to describe my invention with reference to the accompanying drawings, in which I have indicated, more or less diagrammatically, my improved supervisory alarm system and certain of the apparatus adapted for use therein. In said drawings:

Figure 1 shows a side elevation of one of the diaphragm contact devices and of a loop of detector piping connected thereto and including one form of impedance device, the impedance devices and a portion of the piping being shown in section.

Fig. 2 is a view similar to Fig. 1, except that an alternative form of impedance device is shown, and except that the diaphragm contact device is shown in section.

Fig. 3 shows an enlarged detail section of an improved form of detector tube devised by me, and comprising a core wire by which complete closing together of the walls of the tube is prevented. Fig. 4 is a similar section taken after the tube has been partly flattened, showing how the core wire acts to preserve a channel through the tube.

Fig. 5 shows a detail enlarged section and perspective elevation of an alternative form of core wire which may be used.

Fig. 6 shows a detail front view of the diaphragm contact device with one plate of the diaphragm chamber removed.

Referring first to Fig. 1: Numeral 1 designates fluid-pressure-actuated signal-initiating or alarm-initiating device, connected to a loop of detector piping, 2, such loop including, on opposite sides, impedance devices 3, 3, and being connected to the corresponding alarm-initiating contact device, 1, between the impedance devices 3, by a connection 4.

Referring to Fig. 2, it will be seen that the diaphragm contact device 1 comprises a front plate, 18, a rear plate, 19, and a flexible diaphragm 20, also a front contact screw 13, and a rear contact screw, 12. Such diaphragm contact device is also provided with a restricted or regulated escape or leakage device, comprising a short glass tube, 21, of very fine bore, set into a tubular holder 22, and normally covered over by a perforate protecting cap, 23. As previously explained, such a tube, of about the length and diameter specified, is capable of permitting proper escape from pipe loops of greatly differing lengths.

As shown in Fig. 1, similar tubes, there designated by numerals 3, form effective impedance devices in the two sides of the loop; or, in lieu of such tubes, coils 3' may be employed as impedance devices, as shown in Fig. 2. It is not to be understood that the mere coiling of the detector tubing in itself materially increases the resistance to flow through the tubing; what is required, when such impedance devices are employed, is, that there shall be a sufficient length of the detector tubing in such close proximity to the contact device, and so protected, that leakage or obstruction shall not be likely to occur in such length of the detector tubing or between it and the connection to the contact device 1; and in order to have a sufficient length of detector tubing in close proximity to the contact device, and therefore protected to the same extent that such contact device is protected, it is most convenient to coil the pipe.

The resistance of this detector pipe to flow of air through it is such that if a few feet of pipe intervene between a break in the pipe and a point at which heat is applied suddenly, or a point at which pressure is to be effective, the leakage at the break will not prevent operation of the contact device. On the other hand, expansion of the air in the tube at any localized point will cause a sort of wave or pulse of air to pass through the tube, in both directions, so insuring the operation of the corresponding contact device.

Since, however, these waves or pulses of air pressure are often delicate, it is desirable to localize the effect of them on the diaphragm, rather than to permit them to spread out through the diaphragm chamber and lose effect. To this end, as shown particularly in Figs. 2 and 6, both the diaphragm and the back plate of the diaphragm chamber are deeply corrugated, and normally the corrugations of the diaphragm lie close on the corrugations of the back plate. The connection 4 from the detector loop leads into one of the grooves in the back plate of the diaphragm chamber. The result of this construction is that the effect of a pulse of air coming in through connection 4 is at first confined to the groove or corrugation with which that pipe 4 connects, the diaphragm, therefore, being moved quickly, so that it is caused to break contact quickly with its rear contact, 12, and to close contact quickly with its front contact, 13.

It is necessary to provide for the introduction of air into the loops of detector pipe, from time to time, in order to test the loops for responsiveness to rise of pressure exceeding a standard rate. To this end, I provide in each such pipe loop a T-valve casing, having at one end a screw-threaded connection, 26, for a suitable pump, 26′ or other testing device, and having within it a valve stem 27 having two valve plugs, 28 and 29, adapted to fit against corresponding seats in the valve casing. Normally, valve plug 28 prevents escape of air through the open connection 26, and a spring 30 tends to hold the valve stem in such normal position; but when the pump is applied to the valve casing and air is pumped in through connection 26, the valve stem is shifted, and valve plug 29 then prevents the air so pumped in from passing directly by the shortest path to the diaphragm contact device and forces the air to pass throughout the length of the corresponding loop of detector tubing 2.

To contact terminals 12 and 13 I connect electrically signaling devices 31 and 49, respectively, the circuits of these signaling devices being connected to one terminal of a common battery 5, the other terminal of said battery being connected to the frame of the diaphragm contact device. The particular signal devices that I have indicated are annunciator drop mechanisms. The particular annunciator drop mechanism indicated diagrammatically is one wherein the drop, 32, is "up", that is to say, in the horizontal position, when the circuit through its magnet is closed, and is "down", that is to say, in the vertical position in which its face is not visible from the front, when the circuit through the magnet is broken or when the current through such circuit is too weak to hold the drop up. Annunciator mechanism 31 therefore indicates when the diaphragm 20 of the diaphragm contact device 1 leaves contact point 12; and also indicates when battery 5 becomes exhausted, that is to say, when it becomes incapable of supplying sufficient current to hold the annunciator drop up. This annunciator device 31 is therefore, an "O. K." signaling device serving to indicate that the system is in normal working condition and that there is no fire affecting the loop 2. The magnet of annunciator device 49 is energized when the diaphragm of the contact device, after leaving stop 12, makes electric contact with stop 13, as it will, in case a fire occurs within the region detected by the detector loop 2 and so causes expansion of the air in said detector loop, communicated, through the detector loop and connection 4, to the diaphragm chamber. In such case, magnet 49 when energized raises its drop 32 to the display position.

One important feature of my invention is the novel detector tubing employed for the loops 2. As shown particularly in Figs. 1, 3 and 4, the detector tubing consists of a thin walled tube 55 (usually of some soft ductile metal such as copper) within which is a wire 56, which wire is usually of steel or other hard metal. The detector tubing heretofore employed, which has not been provided with this core wire 56 of steel or other hard metal, has been liable to complete closure in case its walls are pinched together, or in case it becomes tangled or knotted, or in case it is bent short. The tubing provided with the hard core wire cannot be closed in this manner, under any ordinary service conditions, because, as illustrated in Fig. 4, if flattened in one direction it is broadened in the opposite direction, and the core wire practically prevents complete flattening of the tube. It is practially impossible under ordinary conditions of service to flatten both the tube and core wire to such extent that the tube is completely closed; even when the core wire has been flattened very greatly by extraordinary pressure applied to it, a space will usually exist, between the flattened core wire and the walls of the tube, at one or more points, through which air can pass.

Since, as above explained, the retardation devices, 3, substantially insure complete operation of the detector loop notwithstanding that the loop may be broken, and the provision of the core wire likewise substantially insures operation of the detector loop even though the tubing of such loop be crushed at one or more points, it is substantially certain that the tubing will remain in condition for service, for a long period of time, notwithstanding settling of the building, sagging of ceilings, etc. As illustrated in Fig. 5, the core wire, there designated by numeral 57, may be grooved or scored or otherwise provided with external longitudinal channels; although ordinarily this is not necessary.

The glass tube retardation devices 3, Fig. 1, constitute electric insulators completely isolating the detector loops, electrically, from the alarm initiating device 1 and the circuits thereof, so minimizing possibility of derangement of the system by short circuiting or other disturbance of circuit conditions through contact of the detector loop with some electric conductor.

To exclude dust from the regulated escape means of the diaphragm contact device illustrated in Figs. 2 and 3, I may provide a layer of porous material 88 (cloth or the like) between the end of the tube 21 and the cap 23.

What I claim is:—

1. In combination, fluid-pressure-actuated means, and a pipe loop, both ends of which are in connection with such fluid-pressure-actuated means, such loop comprising impedance means on both sides.

2. In combination, fluid-pressure-actuated means, and a pipe loop, both ends of which are in connection with such fluid-pressure-actuated means, such loop comprising impedance means on both sides and located in close proximity to said fluid-pressure-actuated means.

3. In combination, a fluid-pressure-actuated contact device, and a pipe loop, both ends of which are in connection with such contact device, said loop comprising impedance means on both sides.

4. In combination, a fluid-pressure-actuated contact device, and a pipe loop, both ends of which are in connection with such contact device, said loop comprising impedance means on each side, and located in close proximity to said contact device.

5. In combination, a fluid-pressure-actuated contact device and a pipe loop, both ends of which are in connection with such contact device, and impeding and insulating means in each side of such loop comprising a small bore glass tube serving both to impede flow of fluid to and from said contact device, and to insulate the pipe loop from such contact device.

6. A contact device for supervisory signaling systems, comprising a fluid-pressure-actuated contact device adapted for connection to detector tubing, and provided with restricted escape means comprising a tubular holder connected to such contact device, and a short length of small bore glass tubing held within said holder.

7. A fluid-pressure-actuated device comprising in combination a diaphragm having grooves dividing its surface into a plurality of divisions, and holding means therefor comprising a correspondingly grooved back plate normally in close proximity to said diaphragm and provided with means for admitting fluid under pressure into one of its grooves and so against one division of the diaphragm.

8. A fluid-pressure-actuated device comprising a diaphragm having grooves dividing its surface into a plurality of divisions, and holding means therefor comprising a correspondingly grooved and ridged back plate, the ridges of said back plate normally entering the grooves of the diaphragm, said back plate having means for admitting fluid under pressure into one of its grooves, and so against one division of the diaphragm.

9. A fluid-pressure-actuated device comprising in combination a diaphragm having grooves dividing its surface into a plurality of divisions, and holding means therefor comprising a correspondingly grooved back plate normally in close proximity to said diaphragm and provided with means for admitting fluid under pressure into one of its grooves and so against one division of the diaphragm, and contact means for the diaphragm.

10. A fluid-pressure-actuated device comprising a diaphragm having grooves dividing its surface into a plurality of divisions, and holding means therefor, comprising a correspondingly grooved and ridged back plate, the ridges of the said back plate normally entering the grooves of the diaphragm, said back plate having means for admitting fluid under pressure into one of its grooves, and so against one of the divisions of the diaphragm, and contact means for the diaphragm.

11. A supervisory system comprising in combination a fluid-pressure-actuated device, and a pipe loop, both ends of which are in connection with such device, said loop comprising a testing valve adapted for connection to a source of supply of fluid under pressure, and provided with valve means normally permitting passage of fluid from both sides of the loop to said fluid pressure actuated device but adapted, upon admission of fluid from an external source, to close direct connection from one side of the loop to such device and to cause fluid to flow through the entire length of the loop in passing to such device.

12. A supervisory system comprising in combination a fluid-pressure-actuated contact device, and a detector tubing connected thereto and having flexible walls, and having within it a relatively hard core occupying a portion only of the bore of the tube, whereby in case the tube is flattened, a passage for air will be maintained.

13. A temperature alarm apparatus comprising a pipe in loop form, a diaphragm, a chamber adjacent said diaphragm, said pipe communicating with said chamber, means disposed in each branch of said pipe and near said chamber for increasing the frictional resistance of said pipe to current flow, and an electrical circuit including an alarm device and controlled by said diaphragm.

14. In combination, fluid-pressure-actuated means, and a pipe loop, both ends of which are in operative relation to such fluid-pressure-actuated means, such loop comprising means on both sides thereof for impeding the circulation of air through the loop.

15. An alarm mechanism, comprising a chamber, a diaphragm in said chamber, a pipe constituting a continuous loop and having both its terminal ends in communication with said chamber, means in each section of said pipe communicating with said chamber for increasing the frictional resistance of said pipe to current flow, an electrical circuit controlled by said diaphragm and an alarm device in said circuit.

16. An alarm mechanism comprising current-pressure-actuated means, a pipe constituting a continuous loop and having both its terminal ends in operative relation to said current-pressure-actuated means, means in each section of said pipe operatively related to said current-pressure-actuated means, means in each section of said pipe operatively related to said current-pressure-actuated means for increasing the frictional resistance of said pipe to current flow, an electrical circuit controlled by said current-pressure-actuated means, and an alarm device in said circuit.

17. A contact device for supervisory signaling systems, comprising a fluid-pressure-actuated contact device, provided with restricted escape means comprising a tube leading from such contact device, a short length of tubing of minute diameter of bore set therein and a perforate protecting cap mounted upon said tube.

18. A contact device for supervisory signaling systems, comprising a fluid-pressure-actuated contact device, provided with restricted escape means comprising a tube leading from such contact device, a short length of tubing of minute diameter of bore set therein and a perforate protecting cap mounted upon said tube, and a layer of porous material inside the cap.

19. An electrical thermostat comprising a case, a diaphragm therein, a contact piece in proximity to said diaphragm, and a tube open at one end to the atmosphere and communicating at the other end with the interior of said case; the said tube being of a length proportioned to cause a predetermined frictional impedance to escape of air from said case.

In testimony whereof I affix my signature in the presence of two witnesses.

JAMES G. NOLEN.

Witnesses:
H. M. MARBLE,
FRANK E. RAFFMAN.

Copies of this patent may be obtained for five cents each, by addressing the "Commissioner of Patents, Washington, D. C."